US011667205B2

(12) United States Patent
Helm et al.

(10) Patent No.: US 11,667,205 B2
(45) Date of Patent: Jun. 6, 2023

(54) INDUCTIVE CHARGING UNIT FOR A VEHICLE

(71) Applicant: Bayerische Motoren Werke Aktiengesellschaft, Munich (DE)

(72) Inventors: Detlef Helm, Mauth (DE); Josef Krammer, Holzkirchen (DE); Florian Niedermeier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 452 days.

(21) Appl. No.: 16/375,254

(22) Filed: Apr. 4, 2019

(65) Prior Publication Data
US 2019/0225098 A1 Jul. 25, 2019

Related U.S. Application Data

(63) Continuation of application No. PCT/EP2017/075119, filed on Oct. 4, 2017.

(30) Foreign Application Priority Data

Oct. 7, 2016 (DE) ...................... 10 2016 219 476.3

(51) Int. Cl.
*B60L 53/30* (2019.01)
*B60L 53/122* (2019.01)
(Continued)

(52) U.S. Cl.
CPC ................ *B60L 53/30* (2019.02); *B60K 1/04* (2013.01); *B60L 53/12* (2019.02); *B60L 53/122* (2019.02);
(Continued)

(58) Field of Classification Search
CPC ........ B60L 53/30; B60L 53/12; B60L 53/124; B60L 53/122; B60L 53/36;
(Continued)

(56) References Cited

U.S. PATENT DOCUMENTS 3,914,562 A 10/1975 Bolger
8,975,865 B2 * 3/2015 Hickox ................... H02J 50/10
361/600
(Continued)

FOREIGN PATENT DOCUMENTS

CN 104518552 A 4/2015
CN 205051443 U 2/2016
(Continued)

OTHER PUBLICATIONS

PCT/EP2017/075119, International Search Report dated Dec. 15, 2017 (Three (3) pages).
(Continued)

*Primary Examiner* — Richard Isla
*Assistant Examiner* — Manuel Hernandez
(74) *Attorney, Agent, or Firm* — Crowell & Moring LLP

(57) ABSTRACT

An inductive charging unit for a vehicle includes a trough-shaped base support having a base surface and the base surface has laterally enclosing side walls where the base surface and the side walls form a trough. The charging unit further includes a top surface opposite the base surface and a primary coil for inductive coupling to a secondary coil associated with the vehicle, where the primary coil is disposed in the trough. A filling material is disposed in the trough and surrounds the primary coil so as to fix the primary coil mechanically.

11 Claims, 16 Drawing Sheets

(51) Int. Cl.
    *B60L 53/12*       (2019.01)
    *H02J 50/00*       (2016.01)
    *B60L 53/124*     (2019.01)
    *H02J 50/10*       (2016.01)
    *H02J 50/60*       (2016.01)
    *B60K 1/04*        (2019.01)
    *H01F 38/14*      (2006.01)
    *B60L 53/36*      (2019.01)

(52) U.S. Cl.
    CPC ............ *B60L 53/124* (2019.02); *H01F 38/14* (2013.01); *H02J 50/005* (2020.01); *H02J 50/10* (2016.02); *H02J 50/60* (2016.02); *B60L 53/36* (2019.02); *B60L 2240/10* (2013.01)

(58) Field of Classification Search
    CPC ..... B60L 2240/10; H02J 50/005; H02J 50/60; H02J 50/10; B60K 1/04; H01F 38/14
    USPC .................................................. 320/108, 109
    See application file for complete search history.

(56) References Cited

U.S. PATENT DOCUMENTS

| | | | |
|---|---|---|---|
| 9,647,460 B2* | 5/2017 | Becker | H02J 50/12 |
| 11,328,852 B2* | 5/2022 | Kim | H01F 38/14 |
| 11,404,908 B2* | 8/2022 | Böser | B60L 53/12 |
| 2012/0203410 A1* | 8/2012 | Wechlin | B60L 53/38 |
| | | | 701/22 |
| 2013/0249477 A1* | 9/2013 | Keeling | H01F 38/14 |
| | | | 320/108 |
| 2013/0270919 A1* | 10/2013 | Miller | H02J 50/12 |
| | | | 307/104 |
| 2014/0183970 A1 | 7/2014 | Kurihara et al. | |
| 2014/0232331 A1 | 8/2014 | Stamenic et al. | |
| 2016/0308391 A1* | 10/2016 | Easton | H02J 50/10 |
| 2017/0033606 A1* | 2/2017 | Maikawa | H02J 50/005 |
| 2017/0040845 A1* | 2/2017 | Yuasa | B60L 53/38 |
| 2017/0248726 A1* | 8/2017 | Adachi | H01F 27/28 |
| 2017/0326994 A1* | 11/2017 | Yuasa | H02J 50/70 |
| 2017/0338023 A1* | 11/2017 | Ansari | H02J 7/0042 |
| 2021/0050148 A1* | 2/2021 | Laemmle | H01F 27/366 |
| 2021/0091596 A1* | 3/2021 | Soder | H01F 38/14 |
| 2021/0268922 A1* | 9/2021 | Oyaizu | B60L 53/122 |

FOREIGN PATENT DOCUMENTS

| | | |
|---|---|---|
| DE | 10 2011 014 752 A1 | 9/2012 |
| DE | 10 2011 116 738 A1 | 4/2013 |
| DE | 10 2012 202 472 A1 | 8/2013 |
| DE | 10 2013 212 007 A1 | 1/2015 |
| EP | 3 026 682 A1 | 6/2016 |
| ER | 2 620 960 A1 | 7/2013 |
| JP | 2016-119784 A | 6/2016 |
| WO | WO 2011/006884 A2 | 1/2011 |
| WO | WO-2014122121 A1 * 8/2014 ............ B60L 11/182 |
| WO | WO 2016/031209 A1 | 3/2016 |

OTHER PUBLICATIONS

German Search Report issued in German counterpart application No. 10 2016 219 476.3 dated Aug. 4, 2017, with Statement of Relevancy (Thirteen (13) pages).

Chinese Office Action issued in Chinese application No. 201780061361.9 dated Nov. 2, 2021, with English translation (Twenty (20) pages).

* cited by examiner

PRIOR ART

INDUCTIVE CHARGING UNIT FOR A VEHICLE

CROSS REFERENCE TO RELATED APPLICATIONS

This application is a continuation of PCT International Application No. PCT/EP2017/075119, filed Oct. 4, 2017, which claims priority under 35 U.S.C. § 119 from German Patent Application No. 10 2016 219 476.3, filed Oct. 7, 2016, the entire disclosures of which are herein expressly incorporated by reference.

BACKGROUND AND SUMMARY OF THE INVENTION

The invention relates to an inductive charging unit for a vehicle.

Inductive charging units for vehicles are often subject to high demands, which lead to a complex and expensive production process for the charging units.

In document EP 30 26 682 A1 a base unit of a contactless energy transmission system is described.

The object of the invention is to create an inductive charging unit for a vehicle, which contributes to reducing the complexity and costs involved in their production.

The invention is characterized by an inductive charging unit for a vehicle, which comprises a trough-shaped base support. The base support has a base surface and side walls that laterally surround the base surface. The base surface and the side walls form a trough.

The charging unit also comprises a top surface opposite the base surface, and a primary coil. The primary coil is designed for inductive coupling with a secondary coil associated with the vehicle and is arranged in the trough.

Finally, the charging unit comprises a filling material arranged in the trough, which surrounds the primary coil so as to fix the latter mechanically.

The charging unit can be a ground unit, in particular a so-called "on-ground" ground unit.

The base support can be, for example, a punched metal sheet.

The charging unit according to the invention advantageously enables a simple, cost-effective production process.

It allows, in particular, the elimination of additional components which contribute to a high level of complexity and high costs, such as shielding plates, spacers to hold coil parts at a consistent height, and seals to prevent the ingress of dust and moisture. Examples of other purely optional additional components are stabilizing ground structures to protect the charging unit from bending, as well as supporting structures to protect against damage when driven over by a vehicle, for example supporting columns.

In an advantageous design the base support has a convex surface directed from the base surface towards the top surface.

For example, due to the convex surface an air gap is produced underneath the ground unit. This advantageously allows material, weight and hence costs to be saved.

Such a convex surface can be formed particularly simply, for example using deep-drawing or stamping.

In particular, the base support can have a plurality of such curved surfaces.

In a further advantageous design, the base support has a contact area at the edge of the convex surface. The primary coil and the convex surface of the base support are arranged with respect to each other in such a way that mechanical forces produced on being driven over by the vehicle are diverted past the primary coil from the top surface towards the contact surface.

In an advantageous way, this contributes to the robustness of the charging unit, so that the safety of the charging unit when driven over can be ensured with little effort. For example, in the region of the contact area only filling material is arranged in the trough, so that the forces can be diverted through the filling material into the ground. In other words this region of the trough is in particular free of additional components, such as a ferrite of the charging unit.

In a further advantageous design one of the side walls of the base support is formed by the convex surface of the base support. In an advantageous way, as a side wall the convex surface enables an integral design of the base support, and thus a particularly simple and cost-effective manufacture.

The convex surface forming the side wall of the base support in particular comprises a section of the base support which forms an outer side of the charging unit, and a further section of the base support which forms an inner side of the charging unit. The two sections can enclose, for example, an air gap with the ground. The two sections can meet at a top edge of the side wall facing away from the base surface. At each respective end facing away from the top edge, for example, the sections have a contact area.

In a further advantageous design, the side wall of the base support formed by the convex surface of the base support has an outer side facing away from the trough, which is designed as a ramp for the vehicle to drive over. The outer side is in particular the above-mentioned section of the base support, which encloses a predefined ramp angle with the base surface. For example, this angle is between 0° and 45°. In particular in this context the outer side can be curved and have a ramp angle which increases in size towards the trough. In an advantageous way, any displacement of the charging unit when being traversed is largely prevented.

In a further advantageous design a top edge of each of the side walls facing away from the base surface is flush with the top surface. In an advantageous way the side wall thus overhangs the primary coil and/or a ferrite of the charging unit. Advantageously, the side wall can therefore act as a lateral shielding plate for a magnetic field provided during the operation of the charging unit, thus contributing to an efficient charging under inductive coupling with the secondary coil associated with the vehicle.

In a further advantageous design, the base support is designed integrally. In an advantageous way, this allows a simple and cost-effective manufacture of the charging unit.

In a further advantageous design, the base support is configured as a deep-drawn metal sheet. In an advantageous way, this allows a particularly simple and cost-effective manufacture of the charging unit.

In particular, the metal sheet is designed to be conductive, for example made of aluminum, in order to guarantee a targeted shielding of the magnetic field laterally and towards the ground.

In a further advantageous design the charging unit comprises a ferrite structure with an annular body and radial elements running perpendicular to the annular body. The radial elements are coupled to each other via the annular body and arranged spaced apart from each other.

In an advantageous way, this allows savings in materials, installation space, weight and costs while maintaining virtually the same functionality of the charging unit. In particular, in the case of a planar ferrite the remaining free space can be replaced by filling material, thus enabling a dissipation of forces past the ferrite structure.

In a further advantageous design the ferrite structure is arranged underneath a top edge of the side walls that faces away from the base surface. Alternatively or additionally the ferrite structure is spaced apart from each inner side of the side walls of the base support.

Advantageously, the side wall can therefore act as a lateral shielding plate for a magnetic field provided in the operation of the charging unit. Spacing the side wall from the ferrite structure also contributes to the fact that only a small proportion of the provided magnetic field is shielded, thus contributing to an efficient charging under inductive coupling with the secondary coil associated with the vehicle. In particular, the metal sheet in this context is designed to be conductive, for example being made of aluminum, in order to guarantee the described shielding of the magnetic field.

In a further advantageous design the filling material is implemented as a casting compound made from glass-reinforced plastic (GRP) or from short-fiber with epoxy resin.

In a further advantageous design the filling material forms the top surface of the charging unit.

In a further advantageous design the charging unit comprises a cover plate, which forms the top surface of the charging unit. The cover plate has an overhang which overhangs the side walls of the base support on each side. The overhang is also bent towards the base surface of the base support, so that the overhang covers an outer side of the side surfaces facing away from the trough. Advantageously, this contributes to the sturdiness and waterproofing properties of the charging unit.

In a further advantageous design the top surface has a bulged portion facing away from the base surface. This advantageously allows rain water to drain away.

In a further advantageous design the charging unit comprises a flexible sensor fabric for detecting metallic foreign bodies in the region of the magnetic field of the primary coil.

In particular, the flexible sensor fabric can be a meshwork. The meshwork comprises a multiplicity of sensor lines that are connected together parallel to each other in a first direction. The sensor lines generate a plurality of meshes in a second direction perpendicular to the first direction. The meshes of adjacent sensor lines are coupled to each other in each case, so that the sensor lines form the meshwork.

Advantageously, the meshwork allows a reliable detection of foreign objects in the magnetic field. This does not require a printed circuit board (PCB), however, so that a material use, weight, installation space and costs of a device for object detection in a magnetic field can be kept to a minimum. In particular, the meshwork allows a high flexibility in adapting such a device to the area of an energy transmission coil of an inductive charging unit in relation to a standardized PCB manufacture and size. The meshwork can advantageously be produced easily and cost-effectively using established designs and machines. In particular, a number of coils and a mesh size can be easily adapted to suit the task.

The sensor lines are essentially arranged parallel in the first direction. In particular, the second direction is perpendicular to the first direction. The coupled meshes define a meshwork that extends in the first and second direction. The meshes form, in particular, sensor coils of a device for object detection in a magnetic field. The sensor line is preferably formed from an enameled wire. Individual sensor coils can be connected in series.

In particular, the series-connected sensor coils can be wound in the same direction.

Exemplary embodiments of the invention are described in more detail below by reference to the schematic drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
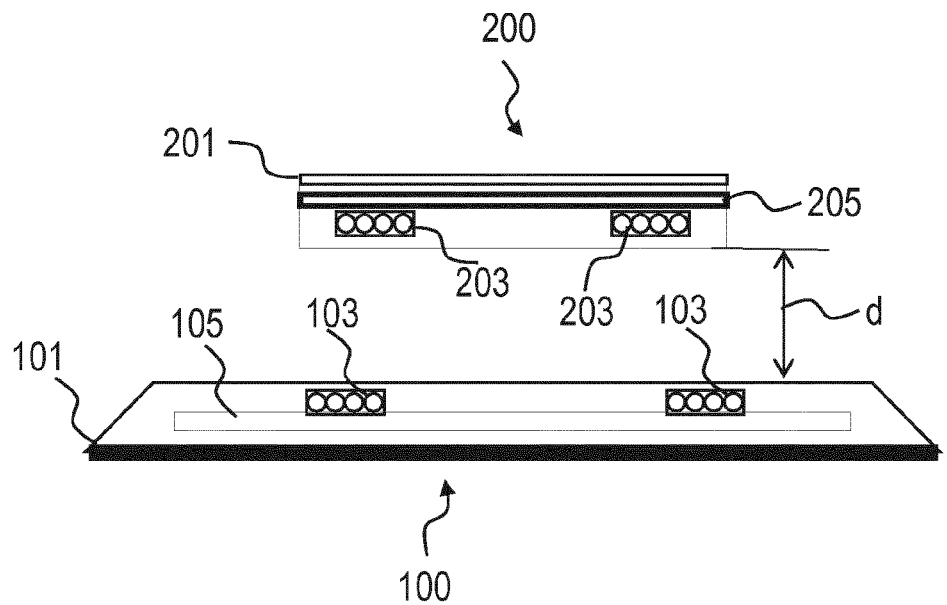
FIG. 1 illustrates the structure of an inductive charging system in cross-sectional view.

Elements of the same design or function are labelled with the same reference numeral across all figures.

FIG. 1 shows a structure of an inductive charging system, comprising a first charging unit 100, which is arranged, for example, on the ground and can also be referred to as a ground unit, as well as a second charging unit 200, which is associated, for example, with a vehicle and is arranged on the underbody thereof.

The first charging unit 100 has a housing 101, a primary coil 103 arranged in the housing 101 and a ferrite 105. Similarly, the second charging unit 200 also comprises a housing 201, a secondary coil 203 and a ferrite 205.

To inductively charge the vehicle the two charging units 100, 200 are arranged on top of each other a predefined distance d apart. An energy transfer takes place via magnetic coupling of the primary and secondary coil 103, 203. Due to the large air gap between the charging units 100, 200 the coils 103, 203, are only loosely coupled together.

Figure 2:
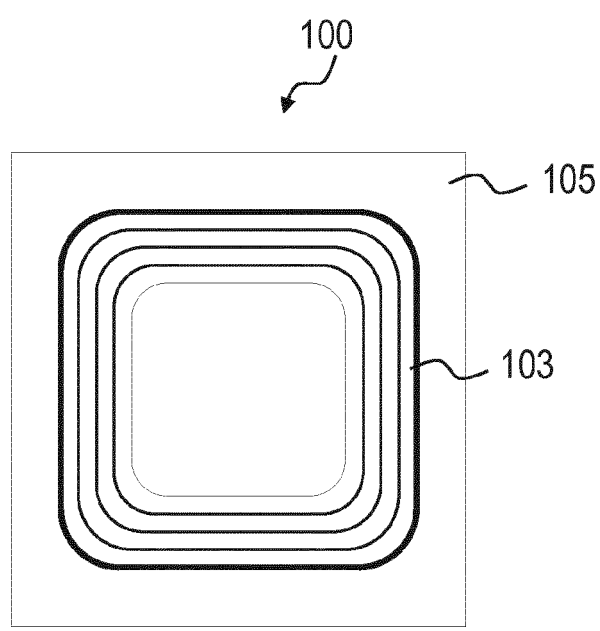
FIG. 2 illustrates an inductive charging unit in plan view.

FIG. 2 shows an example of a structure of the first charging unit 100 in plan view. The second charging unit 200 has essentially an identical design to the first charging unit 100, but vertically reflected. The second charging unit 200 should, among other things, provide protection for its underside against stone chipping and impacting of the vehicle against curbs or the like.

The first charging unit 100 is subject to high mechanical requirements, such as resistance to being driven over, water resistance and resistance against aggressive media. The top of the first charging unit 100 should also provide protection against impact from stones. This is rendered more difficult by the fact that the first charging unit 100 is relatively large, typically larger than the second charging unit 200, and contains very sensitive components. Specific components include in particular the ferrite 105, as ferrites are typically made from very brittle material.

Figure 3:
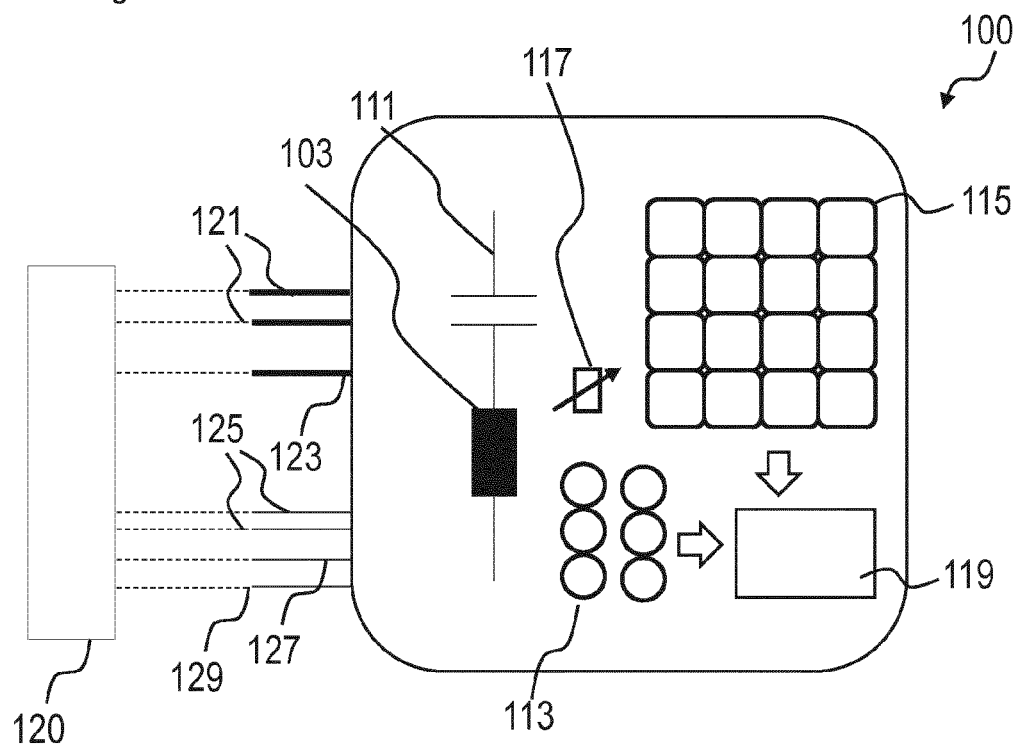
FIG. 3 illustrates the inductive charging unit in a detail view.

FIG. 3 shows the first charging unit 100 again in a schematic detailed view with additional functional components. In addition to the primary coil 103 and the ferrite 105 (not shown in detail), the first charging unit 100, for example, has a resonance capacitor 111 coupled with the primary coil 103. The first charging unit 100 also comprises, for example, a positioning unit 113 for guiding and/or positioning the vehicle with the second charging unit 200 over the first charging unit 100, for example, having six sensor coils, an FOD unit 115, ("Foreign Object Detection", FOD) for detecting foreign objects in the magnetic field of the first charging unit 100, for example having sixty sensor coils, a temperature sensor 117 and a control unit 119 for signal analysis. Alternatively or in addition to the FOD unit 115, an LOD unit, ("Living Object Detection", LOD) can also be used for detecting animals in the air gap or if a person intrudes into the air gap. For the protection of the two charging units 100, 200, in case the FOD unit 115 detects a metallic foreign bod, the primary coil 103 can be switched off.

In addition, the first charging unit 100 has a supply input 121, for example an HF litz wire, through which the first charging unit 100 is supplied with electrical power, for example at a frequency of 85 kHz. In addition the first charging unit 100 has a safety conductor input 123, as well as communication inputs 125, 127 and 129. As an example, the communication inputs 125 are designed for communication by means of the CAN protocol, while a voltage of 12V is applied at the input 127 and a reference potential at the input 129. Optionally, a part of the electronics or the entire electronics of the first charging unit 100 can also be arranged, for example, externally in a wall unit 120 (so-called "wall-box") and coupled to the first charging unit 100 via the inputs 121-129.

The primary coil 103 is typically accommodated in a very robust housing. The housing must be stable enough over an entire coil surface to keep loads away from the coil body. This results in high material, weight and space requirements and still cannot fully protect the ferrites against severe stresses.

In total, all of these requirements give rise to a highly complex structure of the first charging unit 100 with the primary coil 103. Due to many technically highly demanding components, this leads to very high production costs and manufacturing costs.

A design technique for the first charging unit 100 is therefore proposed which satisfies the above requirements with simple means using only a few components.

Figure 4:
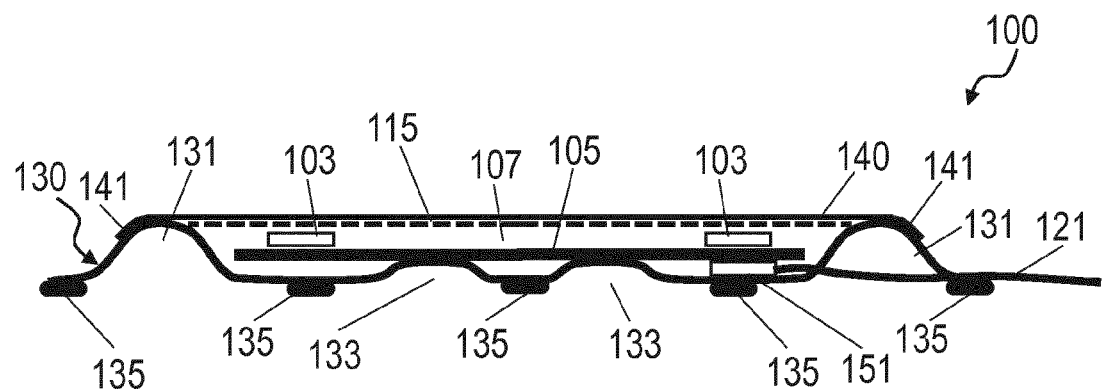
FIG. 4 illustrates a first exemplary embodiment of the inductive charging unit in cross-sectional view.

In a first exemplary embodiment (FIG. 4), the first charging unit 100 has a trough-shaped base support 130. The base support 130 is made, for example, from aluminum, for example from a 2 mm thick metal sheet.

The base support 130 has a plurality of convex surfaces 131, 133, which are formed, for example, by deep drawing and/or stamping of the base support 130. The outer convex surfaces 131 form side walls of the first charging unit 100 and together with a ground surface of the base support and a top surface 140, define a trough volume of the base support 130.

In the trough volume, in addition to the primary coil 103 and the ferrite 105, for example, the FOD unit 115 or the LOD unit can be arranged, as well as other components 151 such as electronics and sensors. The supply input 121 also protrudes into the trough volume, as schematically illustrated.

The trough volume is filled with a casting compound 107. In particular, the primary coil 103, the ferrite 105 and the other components 151 including the HF litz wires of the supply input 121 are encapsulated in the casting compound 107 and thus fixed in the first charging unit 100. Materials that are compatible with electronic components, such as PCB material or materials in the components, can be used as the casting compound 107. Suitable materials for this purpose are, for example, a glass-fiber reinforced plastic (GRP) or another fiber-plastic composite, for example short fiber with epoxy resin.

The casting compound 107 forms, in particular, a housing for the primary coil 103 and/or the ferrite 105 and/or the rest of the components 151 in the trough volume of the first charging unit 100.

The casting compound 107 can both enclose the individual components 103, 105, 151 as well as hold them in position and/or in shape, so that further support structures can be avoided.

In an advantageous way, particularly sensitive components can be protected from mechanical stresses by an elastic coating due to the casting compound 107.

In a design variant not shown here, the cured casting compound 107 can form a cover surface of the first charging unit 100. In the design variant shown a cover plate 140 is arranged on the casting compound 107, which is, for example, a GRP sheet. The cover plate 140 has an overhang 141 on each of its ends with respect to a top edge of the convex surfaces 131, which is also designed convex and bears tightly against a side of the convex surfaces 131 facing away from the ferrite 105. In an advantageous way, this helps to prevent water ingress into the volume of the trough.

On its contact surfaces 137 (see FIG. 10) on the ground, the first charging unit 100 additionally has rubber pads 135, which allow a soft, slip-resistant mounting on the ground.

A cavity formed by the convex surfaces 131, 133 between the base support 130 and the ground serves to reduce material usage and weight. Moreover, due to the central convex surfaces 133 a stiffness of the base support 130 or an overall flexibility of the first charging unit 100 can be set to a specified value. In particular, the shape is such that possibly in combination with the cover plate 140, a required flexural strength of the first charging unit is obtained, allowing an adjustment to uneven ground and give is possible when being driven over.

Figure 5:
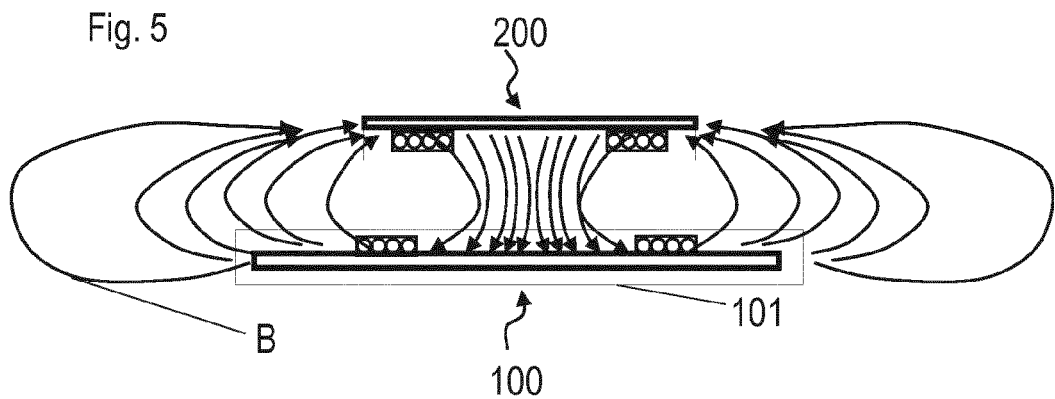
FIGS. 5 and 6 illustrate propagation of magnetic field lines in inductive charging systems in cross-sectional view.
Figure 6:
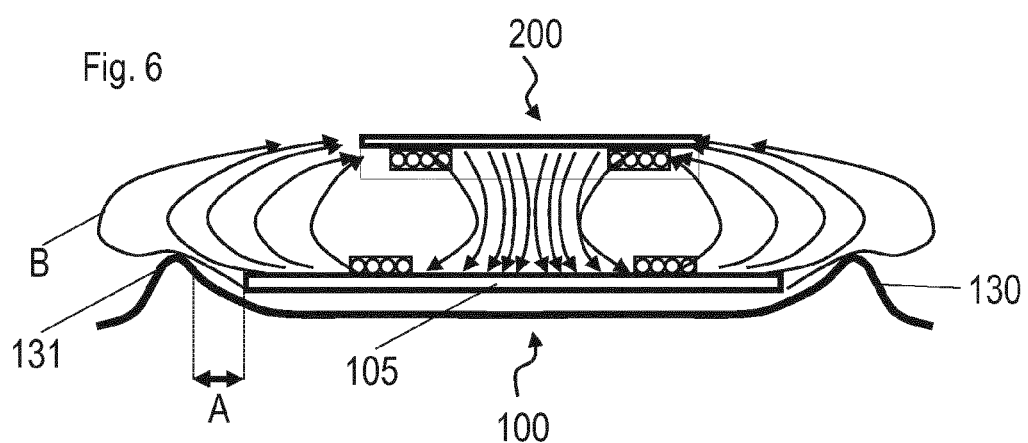

FIGS. 5 and 6 show the propagation of magnetic field lines B in the operation of inductive charging systems.

The first charging unit 100 as shown in FIG. 5 has a conventional housing 101 without a shielding rim. The field lines B propagate a long way out to the sides of the inductive charging system, because there is no shielding present.

The first charging unit 100 as shown in FIG. 6, on the other hand, has a housing with a trough-shaped base support 130 similar to the first exemplary embodiment. The propagation of the field lines B toward the sides of the inductive charging system is significantly reduced in comparison to the first charging unit 100 according to FIG. 5. This is due to the convex surface 131, which acts as a shielding plate.

In particular, the first charging unit 100 is designed in such a way that the convex surface 131 overhangs the ferrite 105 in the vertical direction. In addition, the first charging unit 100 is preferably designed in such a way that only a very small percentage of the field lines B is shielded by the convex surface 131, so that the efficiency of the inductive charging system can be kept high. For example, for this purpose the ferrite 105 is arranged at a predefined distance A to a side of the convex surface 131 facing the ferrite 105.

In an advantageous way, the base support 130 thus ensures an effective shielding of the magnetic field lines B both in the direction of the contact surface of the first charging unit 100 and to the side.

Figure 7:
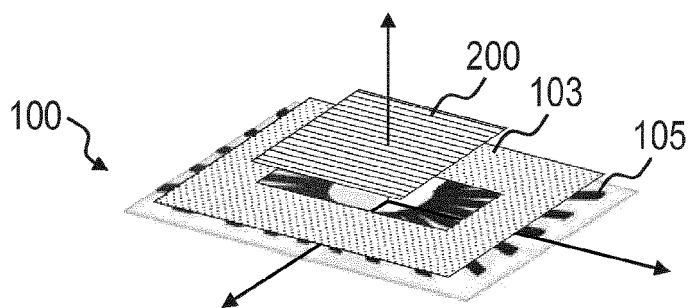
FIGS. 7 to 10 illustrate a second exemplary embodiment of the inductive charging unit in an oblique perspective view, plan view, and cross-sectional view.

FIG. 7 shows a second exemplary embodiment of the first charging unit 100 in an inductive charging system in an oblique perspective view. The first charging unit 100 is designed, for example, similarly to the first exemplary embodiment and differs only in the shape of the ferrite 105. In the design variant shown this has a star-shaped structure. This is, for example, a N95 ferrite from the company EPCOS, which is sintered or cut. In other design variants (FIG. 8), the ferrite 105 can also have a plurality of radial elements 1051, which are connected to each other via a ring 1053. Unlike the design variants illustrated a plurality of other ferrite structures are conceivable that have similar characteristics.

In particular, the ferrite 105 according to the second embodiment has a non-planar structure which is matched to a shape of the magnetic field lines B of a planar ferrite structure. This allows, in particular, material, assembly space and weight to be saved while maintaining almost the same efficiency of the inductive charging system.

Figure 8:
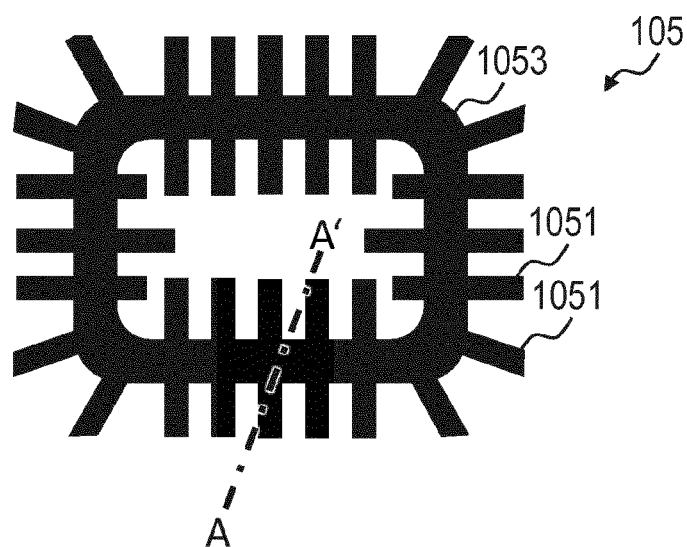
Figure 9:
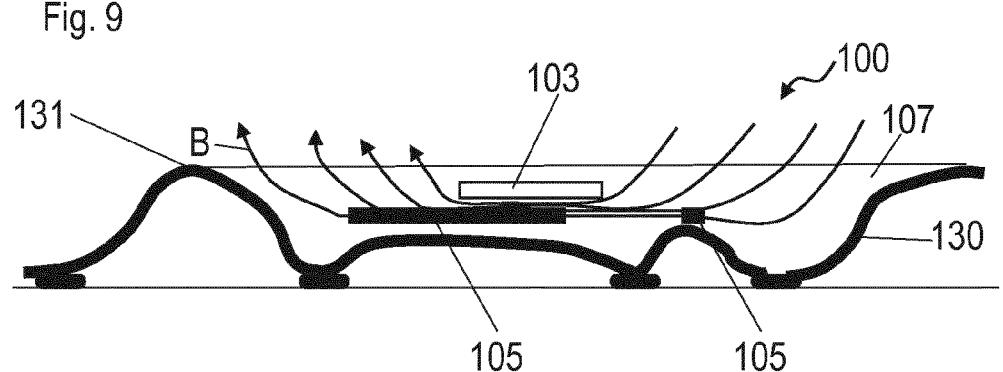

FIG. 9 shows the first charging unit 100 along the cut section A-A' of FIG. 8. As already explained on the basis of FIG. 6, the plate of the base support 130 is shaped in such a way that the magnetic field lines B extend a good distance towards the secondary coil 203, and are blocked in the horizontal direction due to the shielding effect of the high "plate rim".

The casting compound 107 is designed in particular to be magnetically neutral, and together with the ferrite 105 contributes to an optimal conductance of the magnetic field lines B for an efficient coupling with the secondary coil 203.

Figure 10:
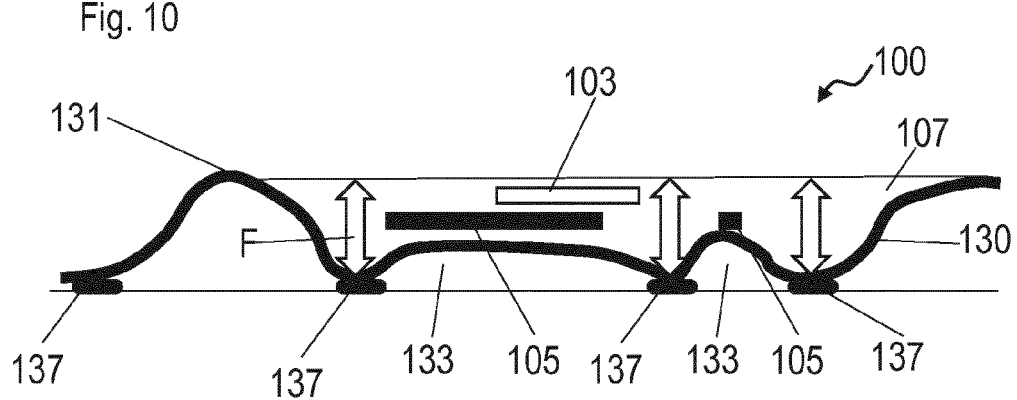

FIG. 10 shows the first charging unit 100 of FIG. 9 under mechanical load. The primary coil 103, the ferrite 105 or the radial elements 1051, and the contact surfaces 137 are arranged in relation to each other in such a way that mechanical forces such as tensile, compression and shear forces can be diverted past sensitive components such as the ferrite 105. FIG. 10 shows an example of compression forces F when being driven over by a vehicle, which are diverted past the ferrite 105 and the primary coil 103. The convex surfaces 133 are designed in particular for this purpose in such a way that the compression forces F are directed past sensitive components into the ground in a targeted way.

The first charging unit 100, in particular the ferrite 105, is advantageously designed in such a way that enough space exists for casting compound 107, in order to route the forces F around the ferrite 105.

Forces can be prevented from being directed into components 151 of the electronics of the first charging unit 100 (see FIG. 12) by arranging the components 151 of the electronics in regions with zero force and if applicable, encapsulating them with an elastic material such as the casting compound 107.

Figure 11:
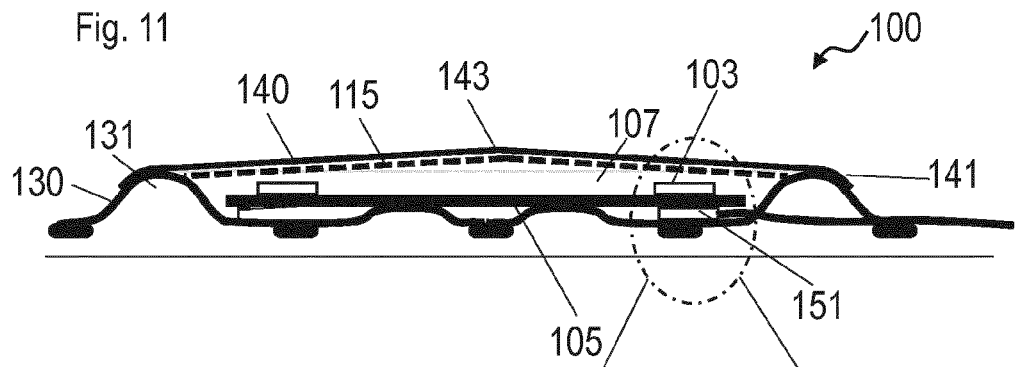
FIGS. 11 and 12 illustrate a third exemplary embodiment of the inductive charging unit in cross-sectional view and enlarged cross-sectional view.

FIG. 11 shows a third exemplary embodiment of the first charging unit 100 in a cross-sectional view. The first charging unit 100 is designed, for example, similarly to the first or second exemplary embodiment and differs in the shape of the cover plate 140. This has a bulged portion 143 with inclined covering surfaces to ensure drainage of rain water.

In addition, to detect foreign objects the first charging unit 100 has a flexibly designed FOD unit 115, which is, for example, laminated along the bulged portion 143 of the cover plate 140. In a preferred design variant the laminated FOD unit 115 forms the cover plate 140. The flexible FOD unit can be advantageously held in shape by the casting material 107.

The flexible FOD unit 115 may, in particular, comprise a flexible sensor fabric such as a meshwork. Such a meshwork, a device comprising the meshwork, a method for producing the meshwork, and a charging unit having the meshwork are explained in detail by reference to FIGS. 15 to 40.

Figure 12:
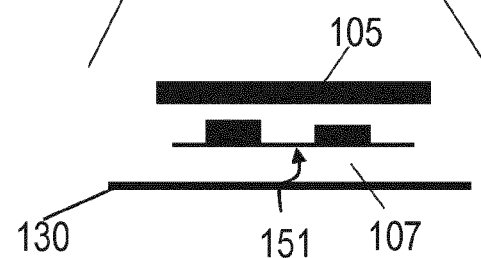

FIG. 12 shows an enlarged detail of FIG. 11. One or more components 151 of the electronics of the first charging unit 100 are arranged between the ferrite 105 and the base support 130, in order to use its shielding effect for shielding the components 151.

The components 151 can be, for example, laminated in directly. In particular, in this context, a complete circuit board of the electronics of the first charging unit 100, or large single components such as film capacitors, can be encapsulated and fixed by the casting compound 107. The properties of the casting compound, such as thermal expansion, should be chosen accordingly.

Figure 13:
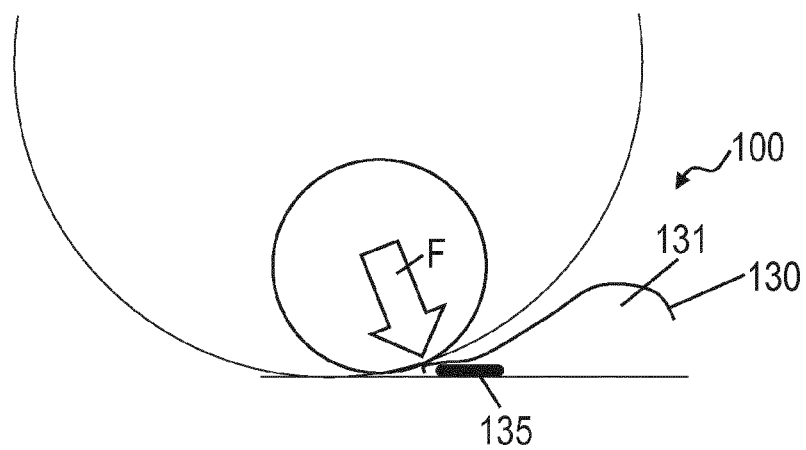
FIG. 13 illustrates a fourth exemplary embodiment of the inductive charging unit in cross-sectional view.

Finally, FIG. 13 shows a fourth exemplary embodiment of the first charging unit 100 in a cross-sectional view. The first charging unit 100 is designed, for example, similarly to the first, second or third exemplary embodiment and differs in the shape of the convex surface 131. This is flattened on its side facing away from the ferrite 105 (not shown in detail here), so that hardly any horizontal forces are produced when driven over by a vehicle. Due to the weight of the vehicle, a high vertical load is generated in the vertical direction. In other words, the edge of the first charging unit 100 is designed as a ramp with a shallow angle, so that when driven over the displacement of the ground unit is largely prevented.

Figure 14:
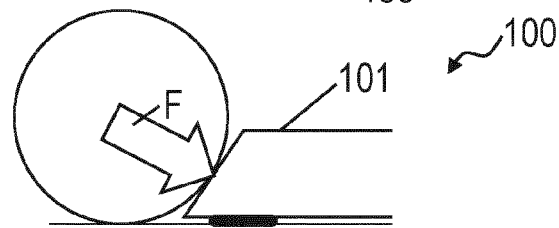
FIG. 14 illustrates a conventional housing of an inductive charging unit in cross-sectional view.

In the case of a conventional housing 101 (FIG. 14) on the other hand, such a shaping is more difficult, for example as a result of aluminum profiles as frame elements. These often have a steeper ramp.

Figure 15:
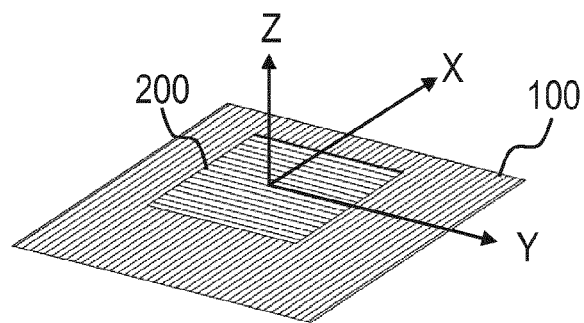
FIGS. 15 to 40 illustrate a meshwork, a device comprising the meshwork, a method for producing the meshwork as well as a charging unit having the meshwork.

FIG. 15 shows the charging system again in an oblique perspective view. The two charging units 100, 200 extend parallel to each other in a first direction X and a second direction Y, spaced apart from each other in a third direction Z. A space between the two charging units 100, 200 for energy transmission is "flooded" with magnetic flux density in its operation. If metallic or conductive foreign bodies 10 are present there (FIG. 16), these would be heated up. In order to prevent this fundamentally, or at least excessive heating, the space is monitored with the FOD unit 115. If metallic objects 10 are present, the transfer of energy or the magnetic field can be switched off. Optionally, a warning can be transmitted to a user.

Figure 16:
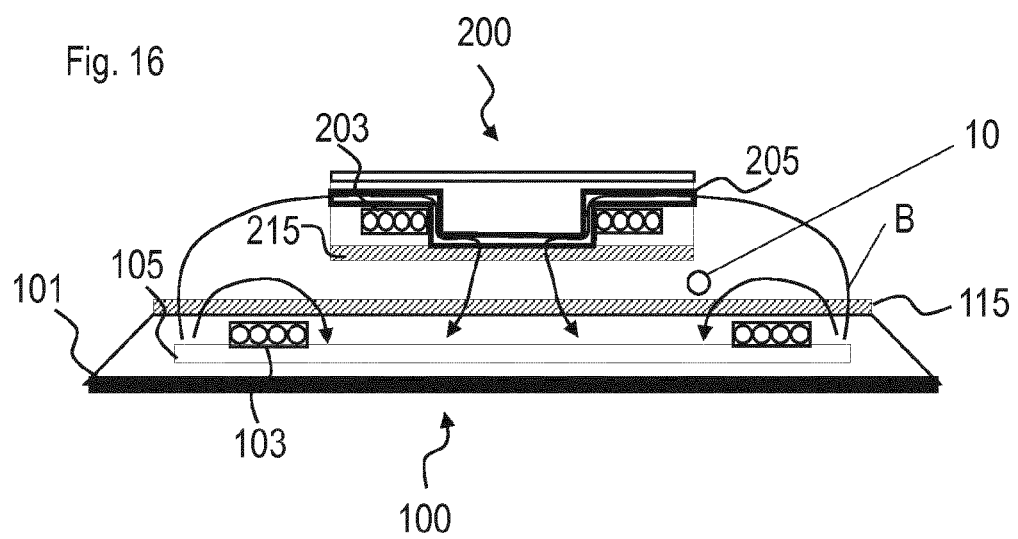

FIG. 16 shows a number of examples of magnetic field lines B. The flux density of the magnetic field in the operation of the two charging units 100, 200 has a high value in the ferrites 105, 205. Close to the windings of the coils 103, 203 the flux density is already lower, and reduces further within the air gap between the two charging units 100, 200. Outside the air gap the flux density is very low. The electrically conductive and/or ferromagnetic object 10 shown in FIG. 16 is located in the area of high field strength.

Figure 17:
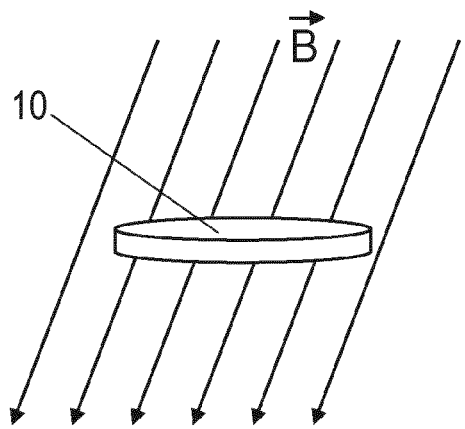

The object 10 is, for example, a flat disc like a coin (FIG. 17). In the object 10 in accordance with the law of induction $$\oint_{\partial A(t)} \vec{E} \cdot d\vec{s} = -\int_{A(t)} \frac{\partial \vec{B}}{\partial t} \cdot d\vec{A}$$

a voltage is induced in the circumference of the object 10, which corresponds to a change in the magnetic flux through its surface. Thus, the effect is smaller when the disc is not perpendicular to the magnetic field lines B (less flux through the disc) and disappears almost completely when the disc is parallel to the magnetic field lines B.

Figure 18:
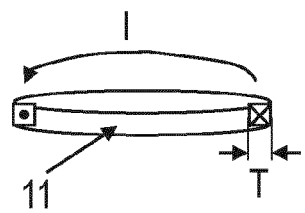
Figure 19:
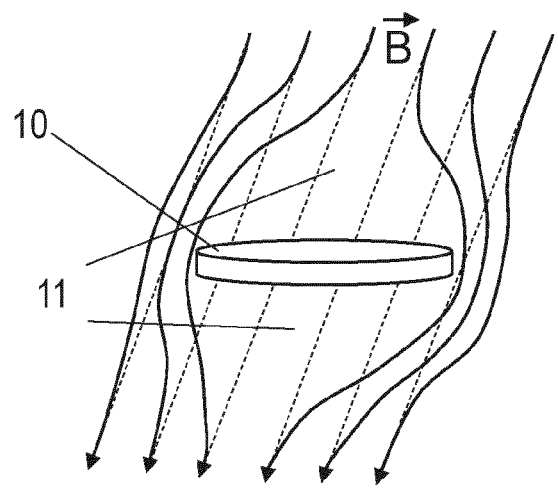

As shown in FIG. 18, this leads to a current flow I at the edge of the object 10 up to a penetration depth T, due to the skin effect. In the interior of the object 10 a field-free region 11 remains. The current flow I generates in turn a magnetic field in the opposite direction, which is superimposed on the magnetic field lines B, so that a field-free region around the object 10 is created, see FIG. 19. The resistive losses from the resistance to the current flow I captured by the skin effect result in losses at the circumference of the object 10.

Figure 20A:
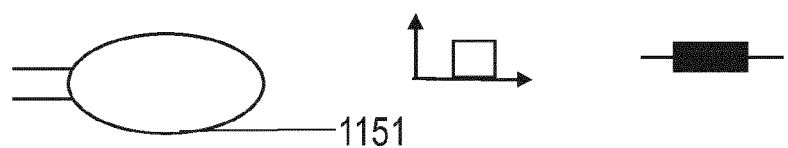

To detect the object 10, for example, sensor coil arrays can be used as the FOD unit 115, which function in a similar way to a conventional metal detector, as shown by the FIGS. 20A-20D. In particular, different measuring methods are conceivable here:

FIG. 20A shows (from left to right) a sensor coil 1151, an excitation pulse and an equivalent circuit diagram for pulse measurement; a decay time constant is suitable as a typical characteristic parameter.

Figure 20B:
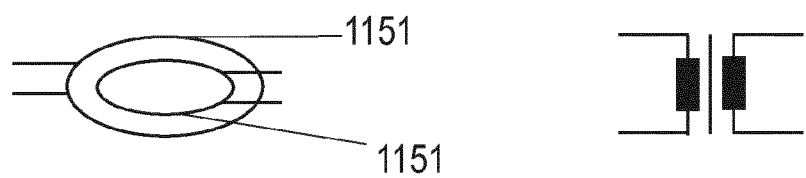

FIG. 20B shows (from left to right) two coupled sensor coils 1151 and an equivalent circuit diagram for measuring by means of AC current excitation; typical characteristic parameters here can be an induction voltage and phase.

Figure 20C:
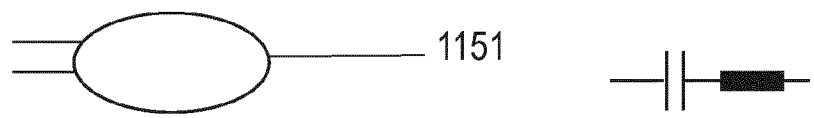

FIG. 20C shows (from left to right) a sensor coil 1151 and an equivalent circuit diagram for resonance measurement; a resonance frequency is suitable as a typical characteristic parameter here.

Figure 20D:
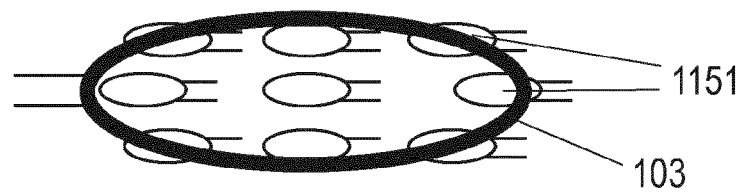

Finally, FIG. 20D shows a plurality of sensor coils 1151 and a primary coil 103 (alternatively, a secondary coil 203 can also be used) in the analysis of the magnetic field of the energy transfer; typical characteristic values in this case are induction voltage and phase.

As already shown in FIG. 16, the FOD unit 115 can be arranged in a plane directly above the primary coil 103 inside the housing 101. Alternatively or additionally, in a similar manner an FOD unit 215 can be arranged in a plane directly below the secondary coil 203 inside the housing 201. A design of these FOD units 115, 215, can be implemented, for example, by means of a printed circuit board, which covers an entire area above or below the coil 103, 203. By means of correspondingly shaped conductor tracks sensor coils 1151 are implemented for the detection of the object 10 by means of the measurement methods described on the basis of FIGS. 20A-20D. With the large surface used for power transmission over or under the coil 103, 203 the region of high magnetic flux density is monitored. For the circuit board at least a two-layer structure is required in order to be able to implement crossovers. Components need not be mounted apart from the contacting elements.

To be able to detect all relevant foreign bodies 10 in all possible positions, for example, very many sensor coils 1151 can be implemented on the circuit board. It should be noted here that while small sensor coils 1151 are sensitive to small objects 10, they are insensitive to objects 10 that are located a long distance from the sensor coils 1151. Also, large sensor coils 1151 are poor at detecting small objects 10. Uniform sensor coils 1151 do not take into account any inhomogeneity of the magnetic field in the operation of the charging units 100, 200. A plurality of coil sizes and shapes of the sensor coils 1151, due to the different sensitivities, in turn requires high application costs. Finally, depending on their position and size the objects 10 in the air gap affect a plurality of sensor coils 1151 at the same time.

Figure 21:
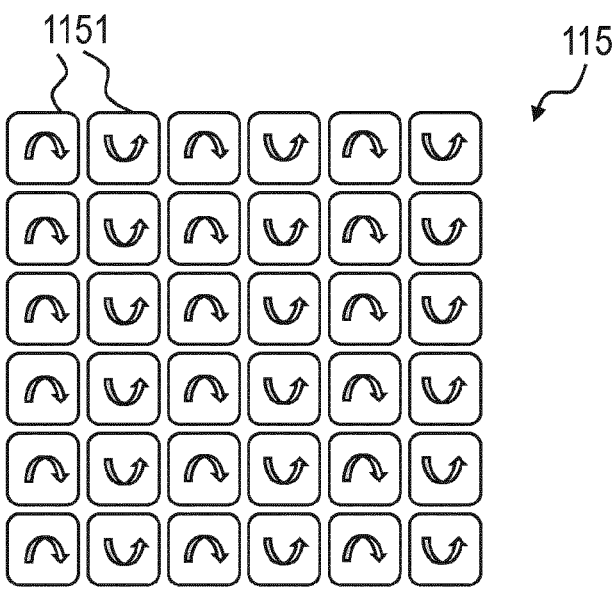

FIG. 21 shows an example of an FOD unit 115 in plan view with thirty-six sensor coils 1151, which according to the number of sensor coils 1151 provides thirty-six different measurement values for the parameters specified in FIGS. 20A-20D.

Figure 22:
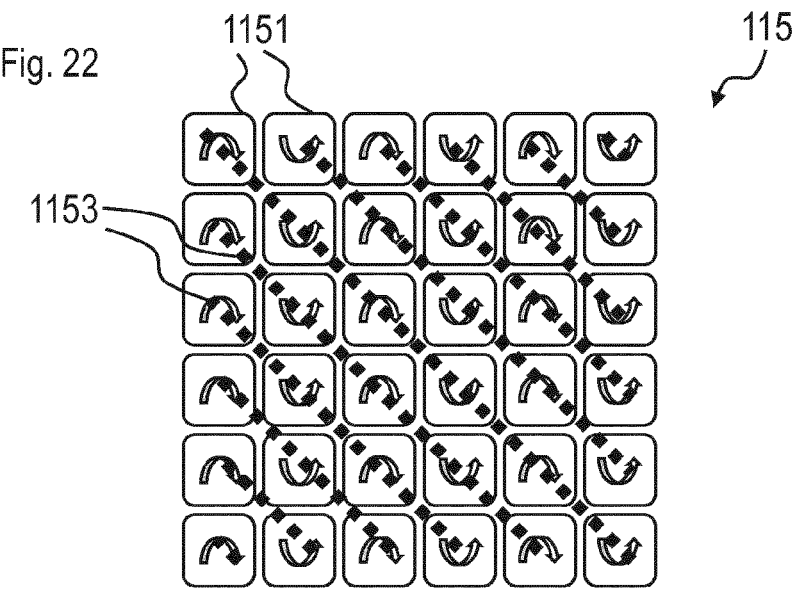

In order not to allow the number of evaluation circuits and operations to become excessively large, the sensor coils 1151 can therefore be connected in series. In FIG. 22, the thirty-six sensor coils 1151 are grouped together into ten coil rows 1153. As shown schematically by the arrows sensor coils 1151 wound in opposite directions are grouped alternately to form a coil row 1153.

Figure 23:
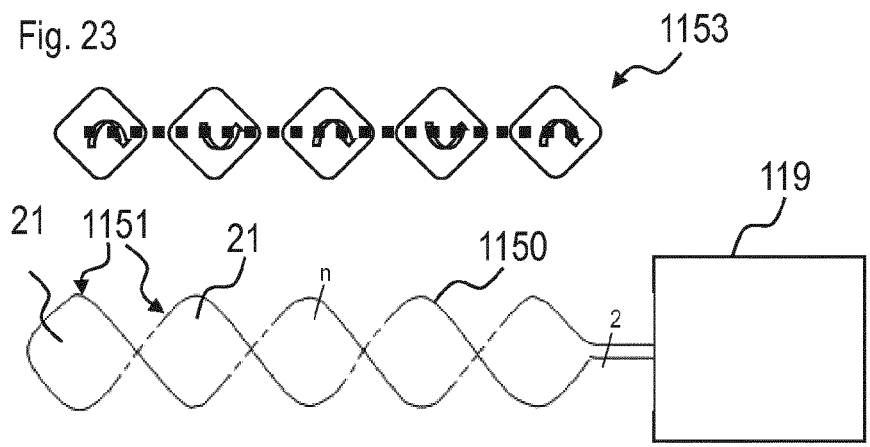
Figure 24:
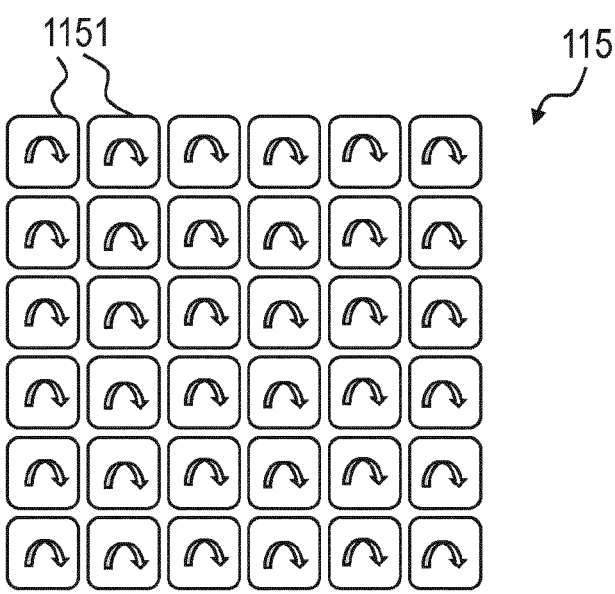
Figure 25:
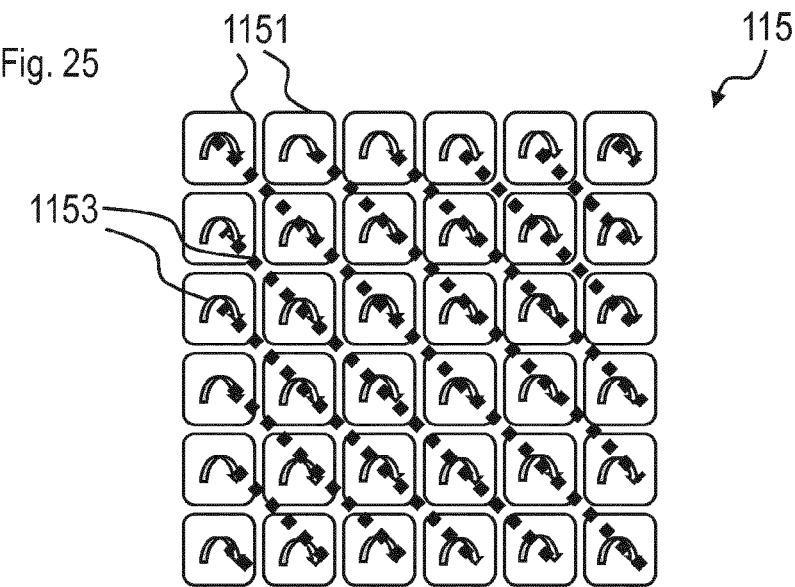

FIG. 23 shows a row of coils 1153 with sensor coils 1151 wound in opposite directions. The coil row 1153 is implemented, for example, by a sensor line 1150, which is coupled at its start and end with the control unit 119 evaluation electronics. By way of example the sensor wire 1150 forms five meshes 21, wherein the part of the sensor line 1150 shown dashed symbolizes a part of the sensor line 1150 which runs in the background. Each mesh 21 in the present case has only one winding. As an alternative to this, the meshes 21 can also have a plurality of windings, thus in the general case, n windings (see FIG. 23). Each of the coil rows 1153 can also be arranged above the respective coil 103, 203 in such a way that the voltages induced by energy transfer almost completely compensate each other.

Due to the size of the area to be monitored very large circuit boards are necessary, or even more than one need to be used. This leads to high costs, since, on the one hand, the area of the printed circuit board(s) results in high costs. When multiple printed circuit boards are used an additional connection technology is required. In addition, due to the size and standard manufacturing dimensions a high level of wastage must be taken into account. In addition, the circuit board must be attached in the corresponding housing 101, 201 using appropriate devices. In particular, in the first charging unit 100 there is a need to ensure sufficient driveover strength and in the second charging unit 200, vehicle underbody requirements such as safe mounting on bollards or similar. This leads to an additional mechanical complexity of the charging units 100, 200.

Figure 39:
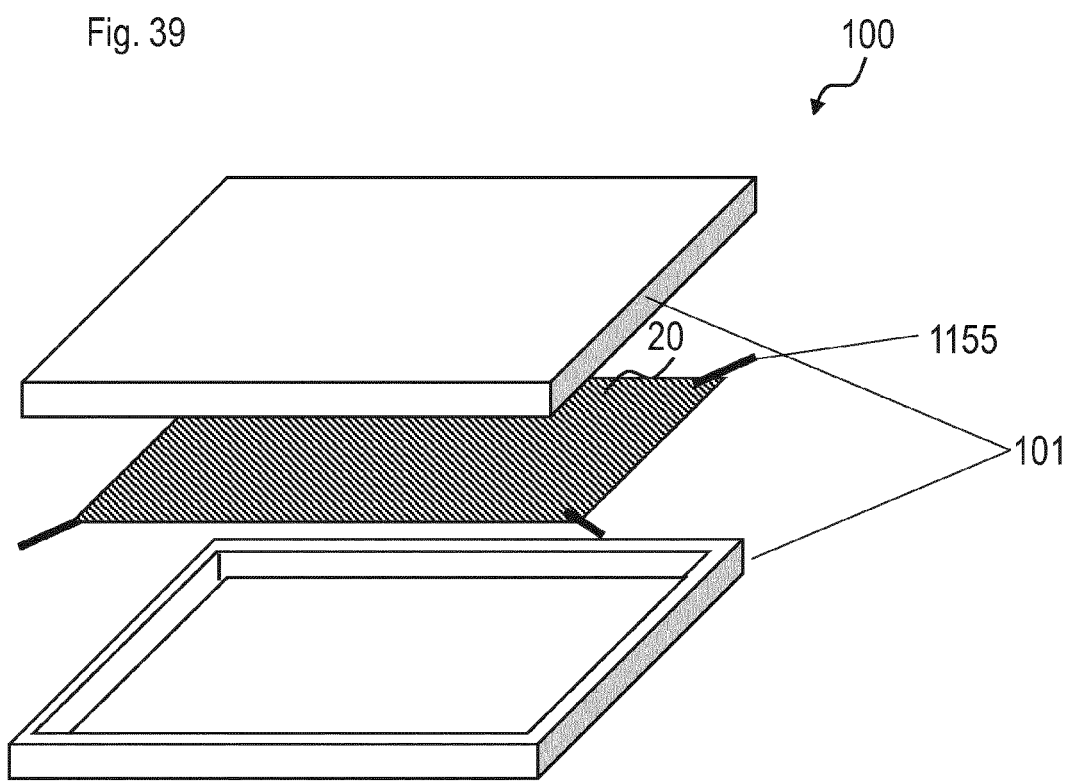
Figure 40:
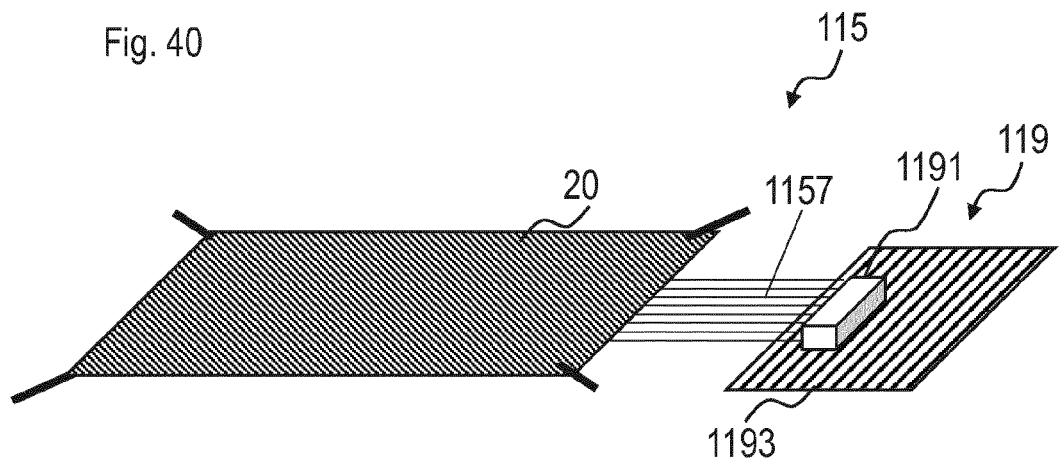

Instead of a circuit board it is proposed to produce a meshwork 20 made of enameled copper wire (FIGS. 24 to 38) and to integrate this meshwork 20 into the housing 101, 201 of the respective coil 103, 203 (FIGS. 39 and 40).

In particular, the following finding is used: if a row of coils 1153 covers both directions of the magnetic field in the operation of the charging units 100, 200, then the induced voltages also compensate each other almost completely, even if the windings are in the same direction. The coil row 1153 is arranged for this purpose in such a way that the sum of the surface elements of the sensor coils 1151 of the respective coil row 1153 multiplied by the flux density perpendicular thereto is approximately zero. This is the case, for example, in an arrangement as in FIG. 16 of the FOD unit 115 of FIG. 24 with coupling of the sensor coils 1151 to form coil rows 1153 according to FIG. 25.

Figure 26:
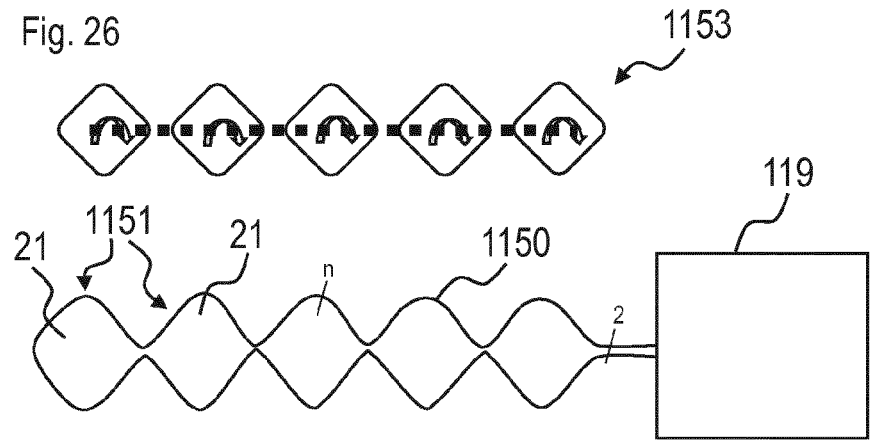

FIG. 26 shows a row of coils 1153 with sensor coils 1151 wound in the same direction similarly to FIG. 23. The coil row 1153 in turn is implemented, for example, by a sensor line 1150 which is coupled at its beginning and end to the control unit 119 evaluation electronics. As an example the sensor line 1150 forms five meshes 21. Each mesh 21 in the present case has only one winding. As an alternative to this, the meshes 21 can also have a plurality of windings, thus in the general case, n windings (see FIG. 26). Each of the coil rows 1153 can also be arranged above the respective coil 103, 203 in such a way that the voltages induced by energy transfer almost completely compensate each other.

Figure 27:
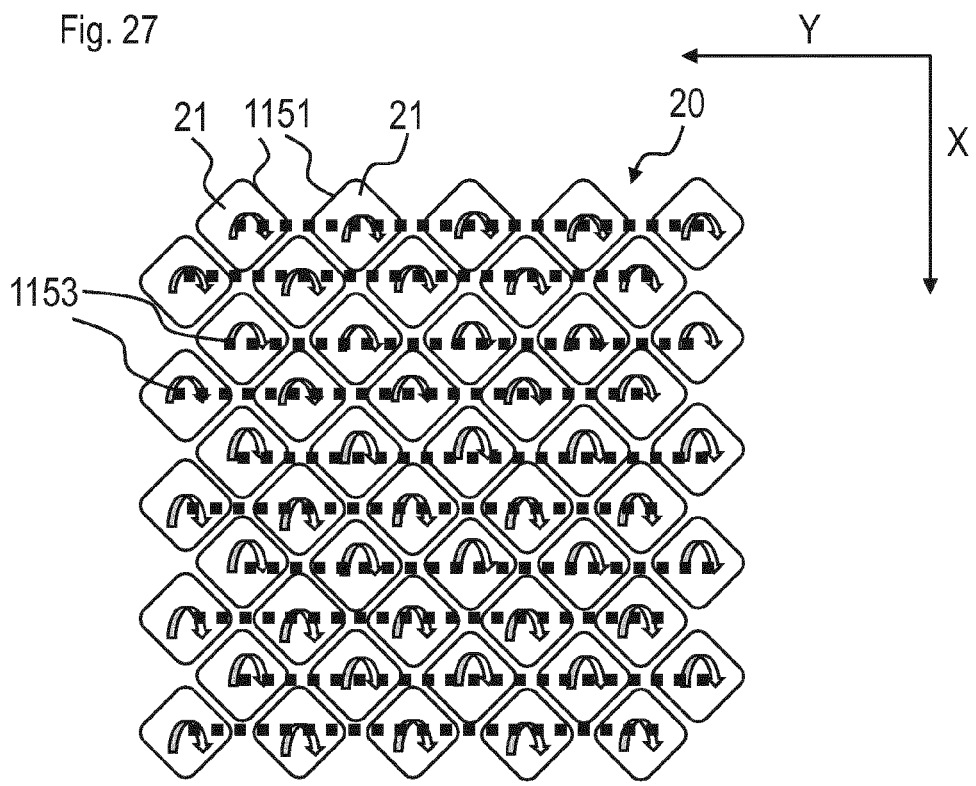
Figure 28:
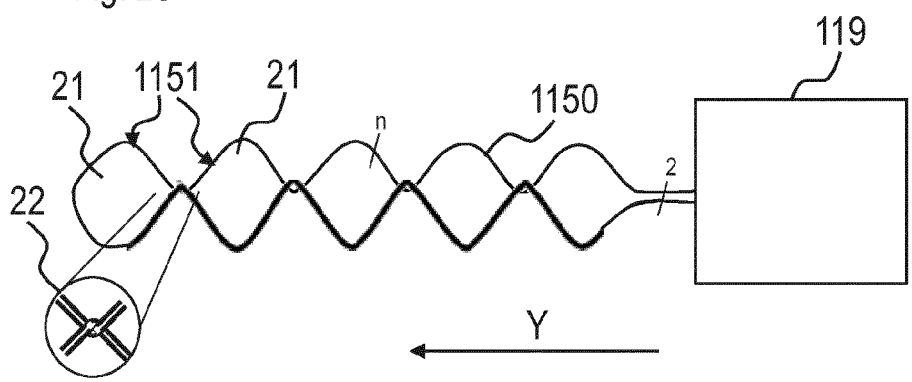
Figure 29:
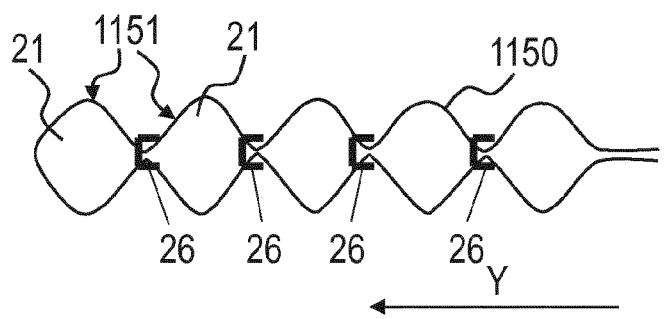

FIG. 27 shows a first example of a meshwork 20, for example consisting of fifty sensor coils 1151, grouped together into ten coil rows 1153, each with five sensor coils 1151. The coil rows 1153 are connected together in parallel with each other in the first direction X, and each extend in the second direction Y.

Each coil row 1153 in this case, similarly to FIG. 26, has a sensor line 1150 with sensor coils 1151 wound in the same direction, wherein the line is formed, for example, from copper enameled wire. In contrast to FIG. 26 however, in a first alternative design (FIG. 28) the sensor line 1150 is crossed at the beginning or end of each mesh 21 with regard to the second direction Y at a crossover point 22, so that a woven structure similar to a chain-link fence is produced.

Additionally or alternatively, in a second alternative design (FIG. 29) the coil row 1153 can have a holder or clip at the beginning or end of each mesh 21 with respect to the second direction Y, by means of which the meshes 26, 21 are held together.

Figure 30:
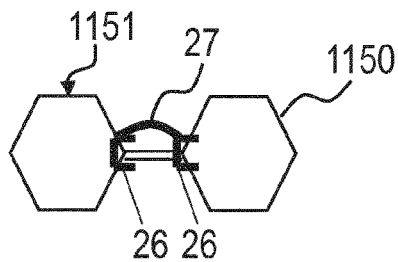
Figure 31:
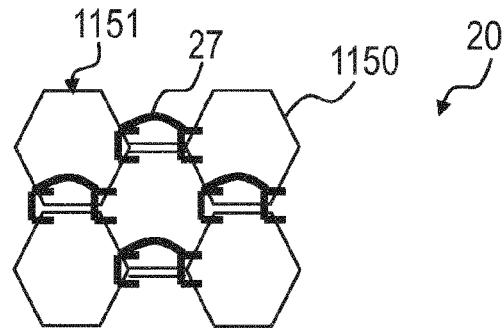
Figure 32:
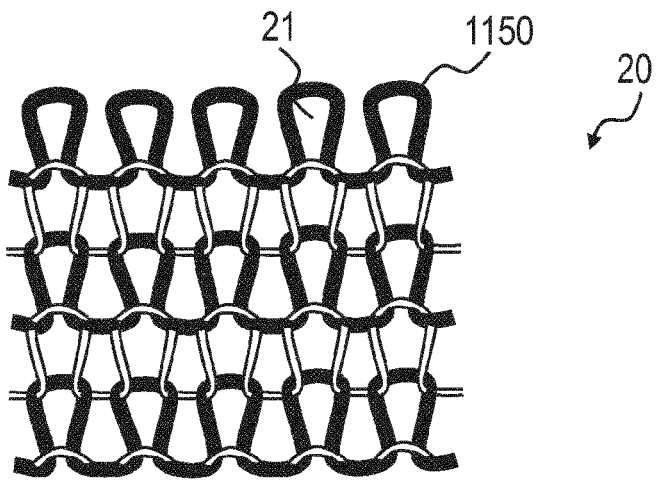
Figure 33:
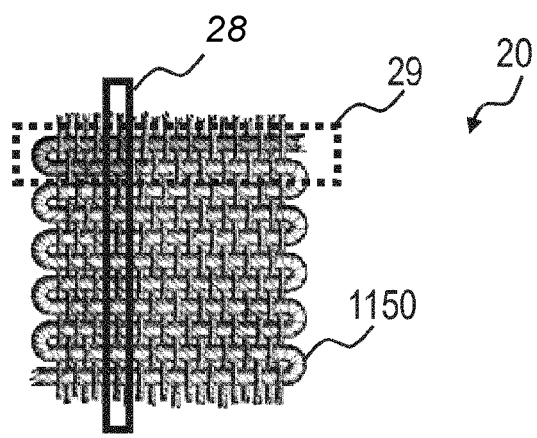

As shown by FIG. 30, such a structure of the meshwork 20 can be supplemented by a spacer 27. This allows, for example, other surface forms to be created, such as a hexagonal meshwork 20 in a second example (FIG. 31).

In a third example (FIG. 32), the meshwork 20 can alternatively also be produced by knitting, or in a fourth example (FIG. 34) also in a woven-like manner. In the production method using knitting the meshes 21, can be additionally held in shape, for example, by holders or clips 26 (cf. FIGS. 29 to 31). In a weaving-like production method, a warp thread 28 and weft thread 29 are used. In contrast to weaving, however, the desired product is not very "coarse-meshed". The weft threads 29 can be used in combination with a comb 24, 25 (see FIGS. 36A-36E) so that the weft thread 29 generates corresponding meshes 21.

Figure 34:
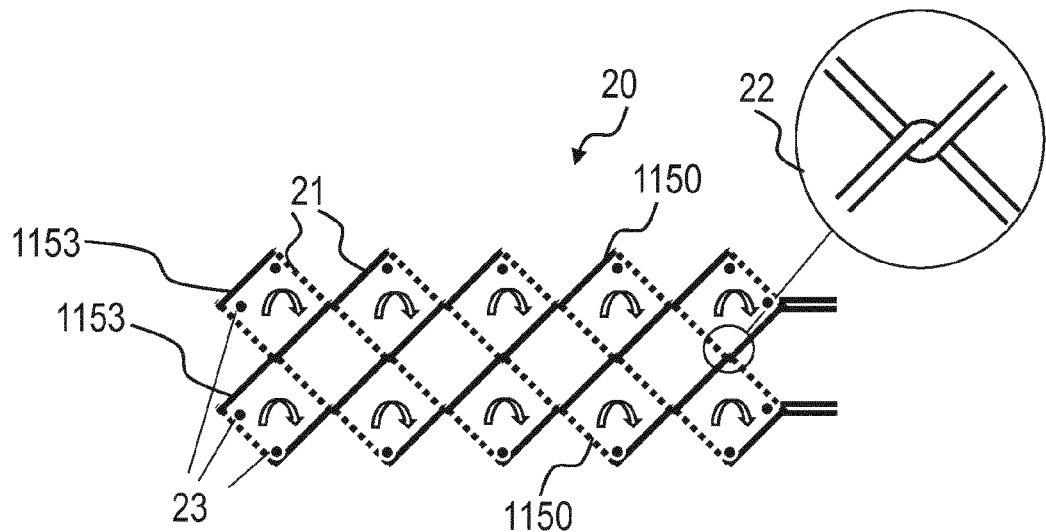

FIG. 34 shows two parallel coil rows 1153 in accordance with the first alternative design of the first example, wherein as in FIG. 23 the part of the sensor line 1150 shown with a dashed line again symbolizes a portion of the sensor line 1150 running in the background. In the same way as the crossing of the respective sensor line 1150, between the meshes 21 of the respective coil row 1153 the sensor lines 1150 here are also concatenated with one another at the beginning or end of each mesh 21 with respect to the first direction X at a crossover point 22.

In addition, the meshwork 20 can have fixing points 23 at the edge, at which it can be clamped.

A free space between the two parallel coil rows 1153 can be covered, for example, by placing an additional coil row 1153 of another meshwork, offset in the first and second direction X, Y, over them in the third direction Z.

Figure 35:
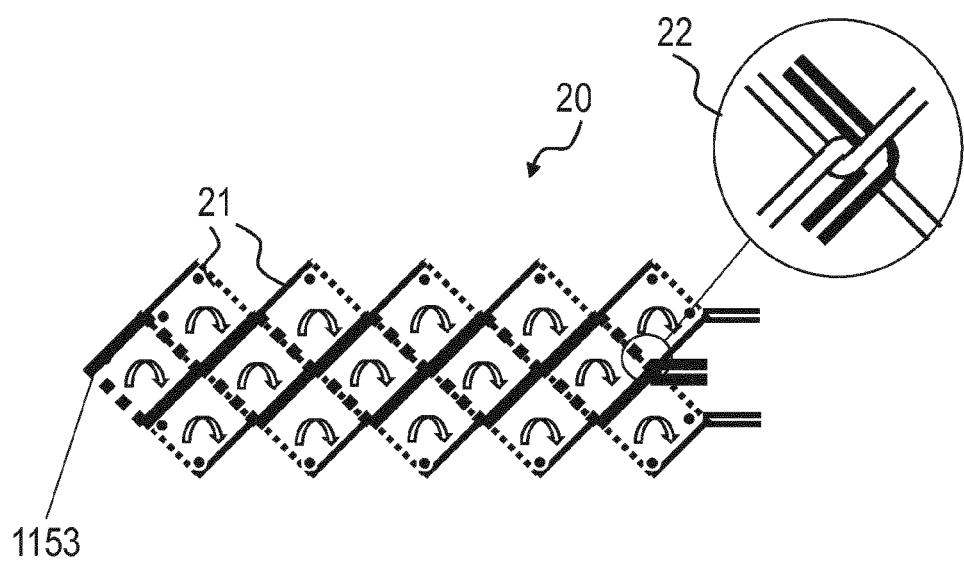
Figure 36A:
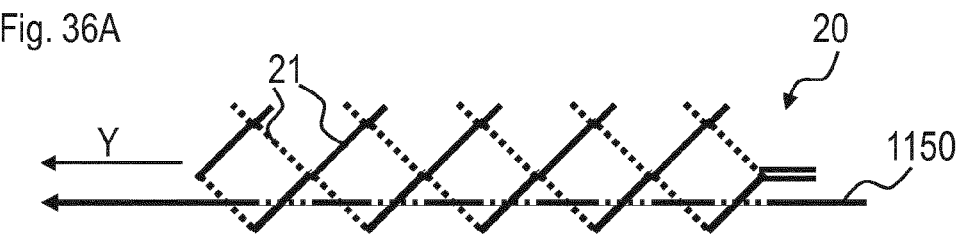
Figure 36B:
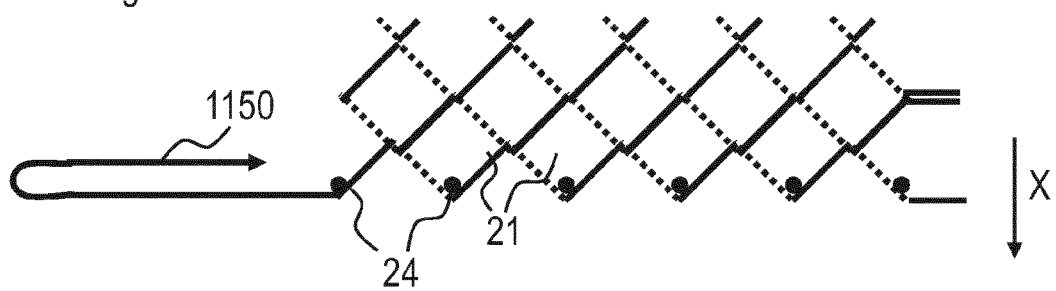
Figure 36C:
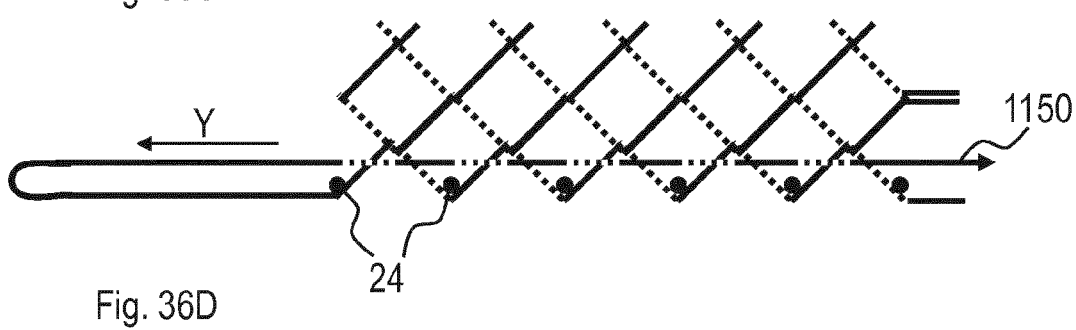
Figure 36D:
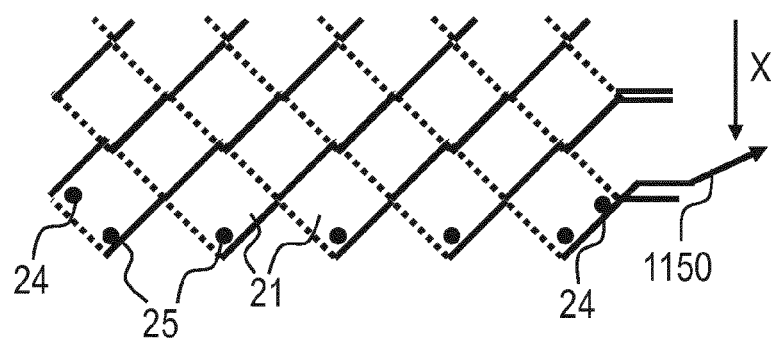
Figure 36E:
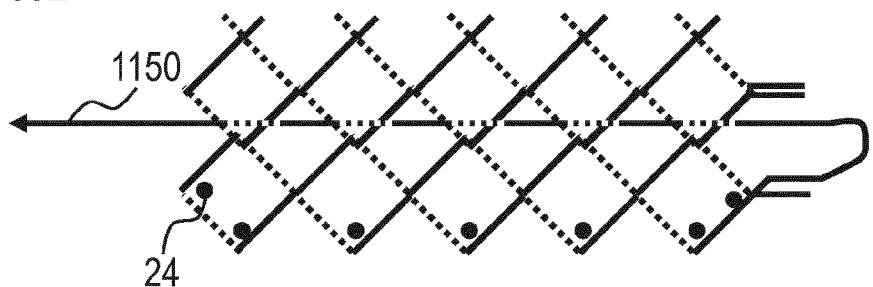

Alternatively, as shown in FIG. 35, in a fifth example the meshwork 20 of FIG. 34 can be expanded to form a more complex meshwork 20, in which an additional coil row 1153 is interlaced into the existing crossover points 22.

By reference to FIGS. 36A to 36E, a method for producing the meshwork 20 of FIG. 34 is presented in the following.

In a first step (FIG. 36A), a sensor line 1150 is routed through existing meshwork 20 in the second direction Y, wherein existing meshes 21 are forced apart.

In a subsequent second step (FIG. 36B) a first comb 24 draws a routed section of the sensor line 1150 in the first direction X.

In a subsequent third step (FIG. 36C) a remaining section of the sensor line 1150 is threaded back through the meshes 21 newly generated by the second step, in the opposite direction to the second direction Y. As in the first step, to this end these meshes 21 are forced apart perpendicular to the plane of the drawing.

In a subsequent fourth step (FIG. 36D) a second comb then pulls down the section of the sensor line 1150 threaded in the third step 25 in the first direction X, so that new meshes 21 are generated in turn.

A subsequent fifth step (FIG. 36E) is essentially the same as the first step. The first through fourth steps are repeated to implement a plurality of windings.

Figure 37:
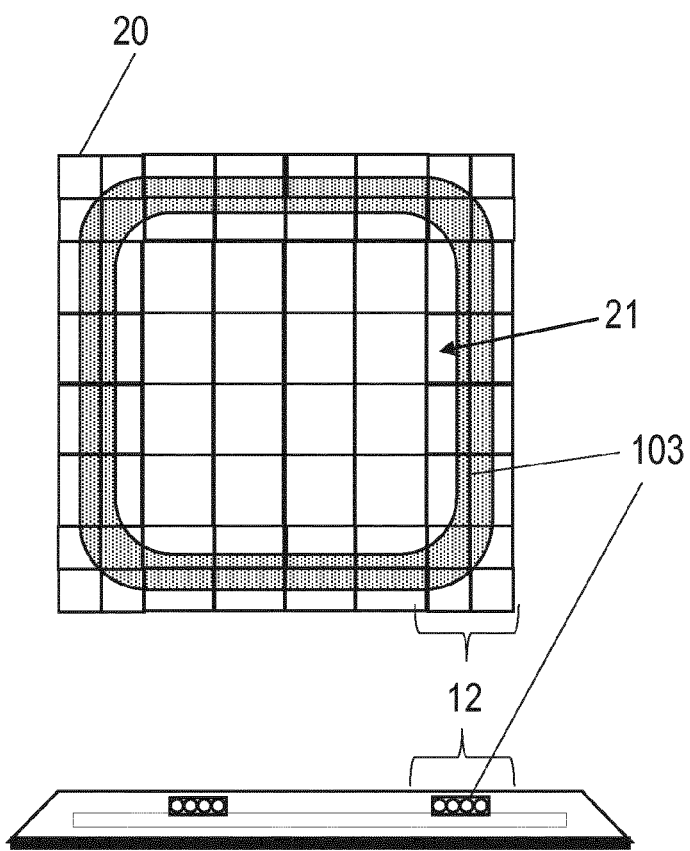
Figure 38:
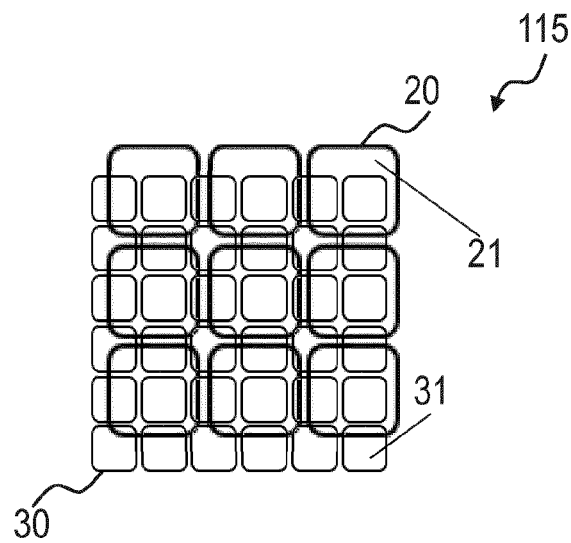

FIG. 37 shows a sixth example of a meshwork 20 in plan view and cross-sectional view above the primary coil 103. In addition to the previous examples, the meshwork 20 has meshes 21 of different sizes. In particular, an area in a region 12 of increased flux density above the windings of the primary coil 103 is matched to the flux density.

Alternatively or additionally, as mentioned above in the context of FIGS. 34, 35, a plurality of meshworks are arranged on top of one another. In the seventh example shown in FIG. 38, two meshworks 20, 30 of different mesh sizes are shown superimposed on one another and slightly offset relative to each other. The meshes 21 of the first meshwork 20 are approximately twice as large as the meshes 31 of the second meshwork 30.

FIG. 39 shows an example of a first inductive charging unit 100. The first charging unit 100 has a housing 101 with, by way of example, two die-cast molded parts.

The top surface of the housing 101, which when coupled to a second inductive charging unit is facing the latter, is formed in particular from a non-conductive material, such as plastic or fiber composites. This allows a simple integration of the meshwork 20 into the housing 101. In particular, the meshwork 20 can be integrated into the housing 101 by lamination in plastic.

For example, the meshwork 20 has retaining elements 1155 at its corners, which clamp the meshwork 20 in the correct position. These can be cast at the same time, for example.

As shown in FIG. 40, the sensor lines 1150 can be routed with the appropriate length from the meshwork 20 as a flexible connection 1157 e.g., to a connector 1191, which is arranged on a circuit board 119 of the control unit 119.

In an advantageous way the meshwork 20 is free of a carrier circuit board. Also, the sensor coils 1151 are not merely stitched onto a fiber roving, but a roving is generated from coil structures instead. These can be cast directly in plastic. The meshwork 20 itself therefore forms the roving.

Individual sensor coils 1151 can be connected in series. The meshwork 20 can advantageously be easily integrated into existing housing components. The sensor lines 1150 that generate the meshwork 20 can be used to simultaneously form a connection wire 1157 to the control unit 119 of the evaluation electronics. To produce the meshwork 20, methods for manufacturing wire meshes and/or additional modifications thereof can be used. Other methods, such as those used in textile manufacturing, can also be used here. By varying the mesh surface areas within a meshwork 20, inhomogeneous requirements within the overall surface area of an FOD unit 115 can be allowed for. In addition, a simple adjustment of the geometry of the meshes 21 may be carried out by the use of additional holders and clips 26. When multiple meshworks 20 on top of one another are used, very dense nets with different mesh sizes can be advantageously implemented.

The meshwork is particularly suitable for use in the charging unit according to the invention. In summary, the following concepts of the meshwork are highlighted:

1st concept:

Meshwork (20) for detecting an object in a magnetic field, comprising a multiplicity of sensor lines (1150), wherein
- the sensor lines (1150) are connected together, parallel to each other in a first direction (X),
- the sensor lines (1150) generate a plurality of meshes (21) in a second direction (Y) perpendicular to the first direction (X), and
- the meshes (21) of adjacent sensor lines (1150) are each coupled to each other, so that the sensor lines (1150) form the meshwork (20).

2nd concept:

Meshwork (20) according to concept 1, in which the meshes (21) of adjacent sensor lines (1150) are interlaced so that the meshwork (20) forms a chained structure.

3rd concept:

Meshwork (20) according to one of the preceding concepts 1 or 2, comprising coupling elements (26), in which the meshes (21) of adjacent sensor lines (1150) are coupled to each other in each case by means of a coupling element (26).

4th concept:

Meshwork (20) according to any one of the preceding concepts 1 to 3, in which the sensor lines (1150) each have a first section running in the second direction (Y) and a second section running in the opposite direction to the second direction (Y), wherein each of the meshes (21) is formed from the first and second section, and the sensor line (1150) is designed in such a way that the second section crosses over the first section at a beginning of each mesh (21) with respect to the second direction (Y) and/or at an end of each mesh (21) with respect to the second direction (Y).

5th concept:

Meshwork (20) according to any one of the preceding concepts 1 to 4, comprising coupling elements (26), in which the sensor lines (1150) each have a first section running in the second direction (Y) and a second section running in the opposite direction to the second direction (Y), wherein each mesh (21) is formed from the first and second section and the second section is coupled with the first section at a beginning of each mesh (21) with respect to the second direction (Y) and/or at an end of each mesh (21) with respect to the second direction (Y), in each case by means of a coupling element (26).

6th concept:

Meshwork (20) according to any one of the preceding concepts 1 to 5, in which the meshes (21) each enclose an area whose size varies in such a way that a size ratio of the surfaces to each other is between 0.5 and 2.

7th concept:

Device (115) for object detection in a magnetic field, comprising a first meshwork (20) according to one of the preceding concepts 1 to 6, and an evaluation electronics (119) for object detection, which is coupled to the sensor lines (1150) of the first meshwork (20) for signal transmission.

8th concept:

Device (115) according to concept 7, comprising a further meshwork (30) according to one of the preceding concepts 1 to 6, wherein the further meshwork (30) is arranged parallel to the first meshwork (20) in a third direction (Z) running perpendicular the first and second direction (X, Y) and spaced apart from the first meshwork (20) and the sensor lines (1150) of the further meshwork (30) are coupled with the evaluation electronics (119) for signal transmission.

9th concept:

Device (115) according to concept 8, in which the meshes (21) of the first meshwork (20) each enclose a first area, and the meshes (31) of the further meshwork (30) enclose a further area, wherein a size ratio of the first area to the further area is between 0.5 and 2.

10th concept:

Method for producing a meshwork (20) for object detection in a magnetic field, in which
- a multiplicity of sensor lines (1150) is provided,
- the sensor lines (1150) are connected together, parallel to each other in a first direction (X), such that the sensor lines (1150) each generate a plurality of meshes (21) in a second direction (Y) perpendicular to the first direction, and the meshes (21) of adjacent sensor lines (1150) are each coupled together so that the sensor lines (1150) form the meshwork (20).

11th concept:

Method according to concept 10, comprising the steps:
- a) providing a first sensor line of the multiplicity of sensor lines (1150), which forms a plurality of first meshes,
- b) providing a further sensor line of the multiplicity of sensor lines (1150) with a first and second section,
- c) arranging the sensor lines (1150) in the first direction (X) connected together and parallel to each other, in such a way that the sensor lines (1150) each generate a plurality of meshes (21) in the second direction (Y) running perpendicular to the first direction (X), and coupling the meshes (21) of adjacent sensor lines (1150) together so that the sensor lines (1150) form the meshwork (20), by the following steps being carried out:
  - c1) routing the additional sensor line in the second direction (Y) by means of the first meshes, in such a way that the first section of the additional sensor line crosses the first sensor line at a beginning of each first mesh with respect to the second direction (Y) and at an end of each first mesh with respect to the second direction (Y),
  - c2) drawing the first section of the additional sensor line in the first direction (X) by means of a first comb (24) between crossover points (22) of the first and additional sensor line, so that one section of the surface is enclosed between the first section of the additional sensor line and the first meshes in each case,
  - c3) routing the second section of the additional sensor line in the opposite direction to the second direction (Y) through the surface sections, in such a way that the second section of the additional sensor line crosses the first section of the additional sensor line at an end of each first mesh with respect to the second direction (Y) and at a beginning of each first mesh with respect to the second direction (Y), and
  - c4) drawing the second section of the additional sensor line in the first direction (X) by means of a second comb (25) in each case between crossover points (22) of the first and second section of the additional sensor line, so that further meshes (21) are formed by each first and second section of the additional sensor line.

12th concept:

Method according to concept 11, in which an end of the second section which is fed out of the meshwork (20) in the opposite direction to the second direction (Y) is used as an additional sensor line with a respective first and second section, and the steps c1) to c4) are carried out again.

13th concept:

Method according to concept 10, in which the meshwork (20) is produced from stitching, weaving or clipping of the sensor lines (1150).

14th concept:

The inductive charging unit (100) according to the invention for a vehicle, comprising a primary coil (103) for inductive coupling with a secondary coil (203) associated with the vehicle, and a device (115) for object recognition according to one of the preceding concepts 7 to 9.

15th concept:

Inductive charging unit (200) for a vehicle, comprising a secondary coil (203) for inductive coupling with a primary coil (103) associated with a ground unit, and a device (215) for object recognition according to one of the preceding concepts 7 to 9.

16th concept:

Charging unit (100, 200) according to one of the preceding concepts 14 or 15, wherein the device (115, 215) is arranged in such a way that voltages induced in the meshes (21) by a magnetic field of the primary coil (103) during the operation of the charging unit (100, 200) compensate each other.

17th concept:

Charging unit (100) according to one of the preceding concepts 14 to 16, comprising a housing (101) with retaining elements (1155), wherein the meshwork (20) is clamped in the housing (101) in a fixed position by means of the retaining elements (1155).

LIST OF REFERENCE CHARACTERS 100 first charging unit
101 housing
103 primary coil
105 ferrite
107 casting compound
111 resonance capacitor
113 positioning unit
115 FOD unit
117 temperature sensor
119 control device
120 wall unit
121-129 input
130 base support
131, 133 convexity
135 rubber pad
137 contact area
140 cover plate
141 overhang
143 bulged portion
151 component
200 second charging unit
201 housing
203 secondary coil
205 ferrite
d distance
B magnetic field line
A distance
F force
X, Y, Z directions
10 foreign body
11 zero-field region
12 region of increased flux density
20 meshwork
21 mesh
22 crossover point
23 fixing point
24 first comb
25 second comb
26 clip
27 spacer
28 warp thread
29 weft thread
30 meshwork
31 mesh
1150 sensor line
1151 sensor coil
1153 coil row
1155 retaining element
1157 connection
1191 connector
1193 circuit board
215 FOD unit
I current flow
T penetration depth The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inductive charging unit for a vehicle, comprising:

a trough-shaped base support with a base surface, side walls that laterally surround the base surface, and a top surface disposed opposite the base surface, wherein the base surface, the side walls, and the top surface define a trough volume of the trough-shaped base support, wherein the trough-shaped base support has a plurality of convex surfaces directed from the base surface towards the top surface, wherein each of the plurality of convex surfaces defines a respective cavity between the trough-shaped base support and a ground surface, wherein the side walls of the trough-shaped base support are formed by outer convex surfaces of the plurality of convex surfaces of the trough-shaped base support, wherein central convex surfaces of the plurality of convex surfaces are disposed between the outer convex surfaces that form the side walls of the trough-shaped base support, wherein the outer convex surfaces that form the side walls of the trough-shaped base support have a greater height than the central convex surfaces, wherein a respective contact surface is disposed between each pair of adjacent convex surfaces and on an outermost side of the outer convex surfaces that form the side walls of the trough-shaped base support, and wherein a respective pad is disposed on each of the respective contact surfaces;

a primary coil for inductive coupling with a secondary coil associated with the vehicle, wherein the primary coil is disposed in the trough volume; and a filling material, wherein the trough volume of the trough-shaped base support is completely filled with the filling material, wherein the filling material is a casting compound made from glass-reinforced plastic (GRP) or made from short-fiber with epoxy resin and the casting compound is magnetically neutral, and wherein the primary coil is encapsulated in the filling material such that the filling material forms a housing for the primary coil and such that the primary coil is mechanically fixed in the inductive charging unit.

2. The inductive charging unit as claimed in claim 1, wherein at least one of the side walls of the trough-shaped base support has an outer side facing away from the trough volume which is configured as a ramp for the vehicle to drive over.

3. The inductive charging unit as claimed in claim 1, wherein each upper edge of side walls facing away from the base surface is flush with the top surface.

4. The inductive charging unit as claimed in claim 1, wherein the trough-shaped base support is formed integrally.

5. The inductive charging unit as claimed in claim 1, wherein the trough-shaped base support is formed as a deep drawn metal sheet.

6. The inductive charging unit as claimed in claim 1 further comprising a ferrite structure disposed in the trough volume and above the central convex surfaces of the plurality of convex surfaces, wherein the ferrite structure includes:
   an annular body; and
   a plurality of radial elements extending perpendicular to the annular body, wherein the plurality of radial elements are coupled together via the annular body and are spaced apart from each other.

7. The inductive charging unit as claimed in claim 6, wherein the ferrite structure is disposed underneath a top edge of side walls that face away from the base surface and/or is spaced apart from an inner side of side walls facing the trough volume.

8. The inductive charging unit as claimed in claim 1, wherein the filling material forms the top surface of the inductive charging unit.

9. The inductive charging unit as claimed in claim 1 further comprising a cover plate which forms the top surface of the charging unit, wherein the cover plate has an overhang which laterally overhangs the side walls of the trough-shaped base support and wherein the overhang is bent towards the base surface of the trough-shaped base support such that the overhang covers an outer side of side surfaces facing away from the trough.

10. The inductive charging unit as claimed in claim 1, wherein the top surface has a bulged portion facing away from the base surface.

11. The inductive charging unit as claimed in claim 1 further comprising a flexible sensor fabric, wherein a metallic foreign body in a region of a magnetic field of the primary coil is detectable by the flexible sensor fabric.

* * * * *